United States Patent Office 2,697,039

Patented Dec. 14, 1954

2,697,039

PREPARATION OF LITHOGRAPHIC PRINTING PLATES

Lawrence E. Martinson, Rochester, N. Y., assignor to Eastman Kodak Company, Rochester, N. Y., a corporation of New Jersey No Drawing. Application October 26, 1953, Serial No. 388,438

3 Claims. (Cl. 95—5.4)

This invention relates to the preparation of stabilized synthetic polymer sensitized zinc plates useful for preparing lithographic printing plates and more particularly to such plates sensitized with cinnamic acid esters of polyvinyl alcohol.

In the Minsk et al. U. S. Patent 2,610,120, granted September 9, 1952, and the Minsk et al. U. S. patent applications Serial Nos. 207,08–52, filed January 20, 1951, Serial Nos. 207,049; 207,050 and 207,051, now Patent Nos. 2,670,285; 2,670,286 and 2,670,287, respectively, are described methods for the preparation of light-sensitive cinnamic acid esters of polyvinyl alcohol and the sensitizing of compositions containing such esters with various compounds such as nitro-aryl, quinone, anthrone, and triphenylmethane compounds and diamino diphenyl carbinol, diamino diphenyl methane and diamino diphenyl ketone compounds. Such light-sensitive esters are disclosed as useful in the preparation of resist images on metal plates such as zinc plates for printing purposes. In such usage, the light-sensitive compositions are coated from solvent onto a metal surface and are exposed under the desired subjects such as a line or halftone subject followed by removal from the plate of the unexposed regions with solvent to yield a light-hardened resist image on the metal surface.

It has been discovered that in general, solvent solutions of the light-sensitive polymeric cinnamic acid esters are stable and in the absence of light do not undergo insolubilization, and generally when the compositions are coated on various surfaces do not become insoluble in the absence of light. However, when the compositions are coated on zinc plates, initially, within a period of about 25 hours, satisfactory resist images can be formed on the zinc plates by the above method but after about 24 hours it is found that even in the dark, the zinc plates apparently have sufficiently changed the solubility of the resin immediately adjacent to the surface of the zinc plate that the quality of the printing plate is decreased. That is, the printing ink adheres to the unexposed areas of the plate ostensibly free of polymeric resist. This effect is particularly noticeable when the cinnamic acid esters of polyvinyl alcohol which were used in coating the zinc plate have been especially sensitized with the above-mentioned compounds. The effect is manifested by the formation of a very thin stratum of sparingly soluble reaction product (resin or other substance) on the surface of the plate, which product is not readily removed by the solvent developer in the unexposed areas which should repel the printing ink, but which tend to attract the ink. This condition is called "scumming." In the case where etched zinc plates are being prepared by forming the resist on the zinc surface followed by etching out those areas not occupied by the resist, the effect of the presence of the insoluble reaction product on the surface of the zinc is to impede the etching process. Consequently, the quality of prints obtained from such zinc printing plates progressively decreases with increase in age of the polymer coating on the zinc plate. The mechanism of the reaction at the surface of the zinc is not evident.

The Smith et al. U. S. patent application Serial No. 266,236, filed January 12, 1952, describes incorporating an insolubilization inhibitor such as hydroquinone into the polymeric cinnamic acid ester coatings to prevent scumming. That procedure is partially effective in preventing scumming but I have discovered that a further improvement can be effected by incorporating about 0.05 to 0.15 gram of triethanolamine in 100 cc. of a 3.75 percent solvent solution of the cinnamic acid esters before coating on the zinc surface. I have found another procedure which makes the processed image more hydrophobic and thus increases the ink-water differentiation between the image and the background areas. This enables the use of more fountain solution for a given ink-carrying capacity and so acts to decrease scumming. The process involves treating the zinc plate upon which the insoluble cinnamic acid ester resist has been formed, with a solution of iodine in carbon tetrachloride. A similar treatment of polyvinyl cinnamate resist images with an aqueous solution of alkali metal permanganate, however, gives a surprising reversal of inking properties. That is, the polyvinyl cinnamate resist becomes water-receptive. This result allows the preparation of a cinnamic acid ester resist image on ink-receptive surfaces such as copper in the usual manner and treatment of the plate with the permanganate solution produces a positive-positive plate in which the metal areas carry the ink and the cinnamic acid ester resist areas repel the printing ink in the presence of moisture.

I have now discovered a procedure for removing this scum on zinc surfaces provided with cinnamic acid ester resist images which is very effective. The process is very simple but surprising in its results. After the formation of the insoluble cinnamic acid ester resist image on a zinc surface, I merely swab the plate with either ethylene glycol monomethyl ether or ethylene glycol monoethyl ether. The chemical or physical mechanisms involved are not clearly understood, however, it appears that these compounds are capable of removing from the surface of the zinc a thin film of reacted polymer which is responsible for the scumming tendencies of the plate. These two compounds are not solvents for the original light-sensitive cinnamic acid ester itself and scumming is not prevented if these two compounds are used initially for the development of the resist image on the zinc surface. Moreover, solvent mixtures of these compounds with other solvents for the polymer are not effective in preventing scum when used for initially developing the resist image. It appears essential that the exposed light-sensitive layer be first developed with a solvent in which the unexposed polymer is highly soluble, such as hydrocarbon solvents, for example, toluene and xylene, aliphatic ketones such as methyl ethyl ketone, aromatic ketones, for example, acetophenone and especially halogenated hydrocarbon solvents such as ethylene dichloride, chlorobenzene and trichloroethylene. After thus developing the polymeric resist image on the zinc surface, I then swab the plate with either ethylene glycol monomethyl ether or ethylene glycol monoethyl ether. A similar compound, ethyleneglycolmonomethylether acetate, is a good solvent for developing the initial resist image. However, this compound is not a solvent for the reacted polymer causing scum and, therefore, does not remove scum from the printing plate.

*Example*

A cinnamic acid ester of polyvinyl alcohol containing approximately 100 mol percent of recurring vinyl cinnamate units (obtained by the esterification of polyvinyl alcohol with cinnamoyl chloride by the process of Minsk et al. patent application Serial No. 207,050, filed January 20, 1951), was provided. A 2.5 percent dope of the polymer in ethylene glycol monomethyl ether acetate was prepared and a suitable sensitizer added such as 1,2-benzanthraquinone, 4,4-tetramethyldiaminodiphenyl ketone or 1-methyl-2-benzoylmethylene-β-naphthothiazoline. The dope was then coated upon a zinc-coated aluminum plate. A plain or grained zinc plate is also satisfactory. The coated plate was then exposed under a line or halftone subject (so-called two-tone subjects) until the polymer coating was insoluble in the exposed area. The resist image was then developed with an active solvent such as those mentioned, preferably by treatment with trichloroethylene vapor. The freshly coated plate carrying the polymeric resist image as thus developed showed a slight tendency toward scumming after treatment with a conventional gum-free "desensitizing etch" and printing on a lithographic press. However, when the trichloroethylene developed plate was swabbed with ethylene glycol monoethyl ether before applying the desensitizing etch, there was no evidence of scumming. The results of the treatment with ethylene glycol monoethyl ether were much more pronounced when applied to a plate carrying a coating of the same polymer which had been aged on the plate for several months before exposure and development of the resist image. This aged plate showed very bad scumming when developed with trichloroethylene, treated with the desensitizing etch, and printed; whereas another sample of the same aged coating on the zinc-coated aluminum which had been exposed, developed with trichloroethylene, swabbed with ethylene glycol monoethyl ether, "desensitized," and printed, showed no evidence of scumming. A similar result was obtained using ethylene glycol monomethyl ether.

The glycol ether treating step of my invention is applicable to the removal of scum on zinc surfaces coated with various cinnamic acid esters of polyvinyl alcohol; for example, polyvinyl cinnamate, polyvinyl o-chlorocinnamate and polyvinyl m-nitrocinnamate. The useful ester should in general contain at least 60 percent cinnamoyl ester groups, the remaining groups in the polymer may, for example, by combined vinyl acetate or vinyl alcohol units. The cinnamic acid ester of polyvinyl alcohol to which my invention is especially applicable is fully esterified polyvinyl cinnamate of the above example which is substantially free of hydroxyl groups. The light-sensitive cinnamic acid ester coatings of the invention may contain various sensitizing agents in concentrations of the order of about 2 to 25 percent, e. g., nitro compounds of U. S. Patent 2,610,120, triphenyl methane, anthrone, quinone and ketone sensitizers of the Minsk et al. U. S. patent application Serial Nos. 207,048–51, filed January 21, 1951, as well as the thiazole sensitizers of the Robertson et al. U. S. patent application Serial No. 314,806, filed October 15, 1952. Pigments and dyes may also be contained in the coatings for various purposes which will be apparent to those skilled in the art. Also, instead of using the pure glycol ethers of the invention to alleviate scumming, I find that a limited amount of water can be tolerated in the solution used for treating the developed printing plate, the quantity of which can be best determined by simple experiment under the particular conditions of operation.

What I claim is:

1. A process for preparing a printing plate which comprises exposing to a line or half-tone subject a layer of a cinnamic acid ester of polyvinyl alcohol coated upon a zinc surface, applying to the surface of the exposed layer an organic solvent in which the cinnamic acid ester is highly soluble until the cinnamic acid ester has been removed from the zinc surface only in the unexposed region, and swabbing the layer with a member of the class consisting of ethylene glycol monomethyl ether and ethylene glycol monoethyl ether.

2. A process for preparing a printing plate which comprises exposing to a line or half-tone subject a layer of polyvinyl cinnamate coated upon a zinc surface, applying to the surface of the exposed layer an organic solvent in which the polyvinyl cinnamate is highly soluble until the polyvinyl cinnamate has been removed from the zinc surface only in the unexposed region, and swabbing the layer with a member of the class consisting of ethylene glycol monomethyl ether and ethylene glycol monoethyl ether.

3. A process for preparing a printing plate which comprises exposing to a line or half-tone subject a layer of polyvinyl cinnamate coated upon a zinc surface, applying trichloroethylene to the surface of the exposed layer until the polyvinyl cinnamate has been removed from the zinc surface only in the unexposed region, and swabbing the layer with a member of the class consisting of ethylene glycol monomethyl ether and ethylene glycol monoethyl ether.

No references cited.